United States Patent
Annable et al.

(10) Patent No.: US 9,040,620 B2
(45) Date of Patent: May 26, 2015

(54) PROCESS, DISPERSIONS AND USE

(75) Inventors: Tom Annable, Manchester (GB); Mark Holbrook, Manchester (GB); Neil Anthony Tallant, Manchester (GB); John Patrick O'Donnell, Manchester (GB)

(73) Assignee: Fujifilm Imaging Colorant Limited, Manchester (GB)

( * ) Notice: Subject to any disclaimer, the term of this patent is extended or adjusted under 35 U.S.C. 154(b) by 225 days.

(21) Appl. No.: 13/120,869

(22) PCT Filed: Oct. 1, 2009

(86) PCT No.: PCT/GB2009/051285
§ 371 (c)(1),
(2), (4) Date: Mar. 24, 2011

(87) PCT Pub. No.: WO2010/038071
PCT Pub. Date: Apr. 8, 2010

(65) Prior Publication Data
US 2011/0169900 A1    Jul. 14, 2011

(30) Foreign Application Priority Data
Oct. 2, 2008   (GB) .................. 0817996.2

(51) Int. Cl.
| C09D 11/326 | (2014.01) |
| C09B 67/00 | (2006.01) |
| C09B 67/08 | (2006.01) |
| C09B 67/46 | (2006.01) |
| C09B 67/54 | (2006.01) |
| C09B 67/02 | (2006.01) |

(52) U.S. Cl.
CPC .......... *C09D 11/326* (2013.01); *C09B 67/0013* (2013.01); *C09B 67/009* (2013.01); *C09B 67/0096* (2013.01); *C09B 67/0097* (2013.01)

(58) Field of Classification Search
CPC .......... C09B 67/00; C09D 11/00; B01F 17/00
USPC ................... 524/556; 526/89; 106/31.85, 499
See application file for complete search history.

(56) References Cited

U.S. PATENT DOCUMENTS

| 6,087,416 A | 7/2000 | Pearlstine et al. ........... 523/160 |
| 6,245,832 B1 | 6/2001 | Suzuki et al. .................. 523/160 |
| 7,253,216 B2 | 8/2007 | Miyabayashi ................ 523/205 |
| 2004/0244622 A1 | 12/2004 | Ichinose et al. .............. 101/491 |
| 2005/0134665 A1 | 6/2005 | Wang et al. .................... 347/100 |
| 2005/0176877 A1 | 8/2005 | Miyabayashi ................ 524/556 |
| 2006/0124032 A1* | 6/2006 | Ichinose et al. .............. 106/400 |
| 2006/0142417 A1* | 6/2006 | Kaneko et al. ................ 523/160 |
| 2006/0222851 A1 | 10/2006 | Miyabayashi et al. ........ 428/408 |
| 2008/0071007 A1 | 3/2008 | Spinelli ......................... 523/200 |
| 2009/0220693 A1 | 9/2009 | Takemura et al. |

FOREIGN PATENT DOCUMENTS

| EP | 1 086 975 | 10/1999 | ............. C08J 3/03 |
| EP | 1 780 246 | 5/2007 | ............ C09D 11/00 |
| EP | 1 783 182 | 5/2007 | ............ C09D 11/00 |
| EP | 1 897 919 | 3/2008 | ............ C09D 11/00 |
| JP | 1997-104834 | 4/1997 | |
| JP | 2006-008897 A | 1/2006 | |
| JP | 2006-182864 | 7/2006 | ............ C09D 11/00 |
| JP | 2006-257122 | 9/2006 | ............ C09D 11/00 |
| JP | 2006-282730 | 10/2006 | ............ C09D 17/00 |
| JP | 2006-342294 | 12/2006 | ............ C09D 11/00 |
| JP | 2007-051199 | 3/2007 | ............ C09D 11/00 |
| JP | 2007-153985 | 6/2007 | ............ C09D 11/00 |
| JP | 2007-186569 | 7/2007 | ............ C09D 17/00 |
| JP | 2007-217507 | 8/2007 | ............ C09D 11/00 |
| JP | 2007-314784 A | 12/2007 | |
| JP | 2008-150535 | 7/2008 | ............ C09D 11/00 |
| WO | WO 98/44058 | 10/1998 | ............ C09D 11/00 |
| WO | WO 2004/003090 | 1/2004 | ............ C09D 11/00 |
| WO | WO 2004/111140 | 12/2004 | ............ C09D 11/00 |
| WO | WO 2006/019661 | 2/2006 | ............ C09D 11/00 |
| WO | WO 2006/064193 | 6/2006 | ............. B01J 13/00 |
| WO | WO 2007/126145 | 11/2007 | ............ C09D 11/00 |
| WO | WO 2007126145 A2 * | 11/2007 | |
| WO | WO 2008/043984 | 4/2008 | ............ C09D 11/00 |

\* cited by examiner

*Primary Examiner* — Kelechi Egwim
(74) *Attorney, Agent, or Firm* — Morgan, Lewis & Bockius LLP

(57) ABSTRACT

A process for preparing an encapsulated pigment dispersion suitable for use in an ink jet printing ink comprising the following steps in the order I) followed by II):

I) providing a dispersion comprising a pigment, a liquid medium and a dispersant comprising the repeat units from copolymerizing the ethylenically unsaturated monomers in components a) to c):
a) from 75 to 97 parts of one or more hydrophobic ethylenically unsaturated monomers comprising at least 50 parts benzyl (meth)acrylate;
b) from 3 to 25 parts one or more hydrophilic ethylenically unsaturated monomers having one or more ionic group(s);
c) from 0 to 2 parts of one or more hydrophilic ethylenically unsaturated monomers having a hydrophilic non-ionic group; and
wherein the parts are by weight and the sum of the parts a) to c) add up to 100;
II) cross-linking the dispersant in the presence of the pigment and the liquid medium.

24 Claims, No Drawings

PROCESS, DISPERSIONS AND USE

This application is a 371 filing based on PCT/GB2009/051285, filed Oct. 1, 2009, which claims priority to United Kingdom Application No. 0817996.2, filed Oct. 2, 2008, all of which are hereby incorporated by reference in their entirety.

The present invention relates to a process for preparing encapsulated pigment dispersions, to the encapsulated pigment dispersions obtainable by the process and to the use of the process for preparing ink jet printing inks.

Inks are often of one of two types, depending on the type of colorant used. Dye-based inks often comprise a dye dissolved in a liquid medium. Pigment inks comprise a pigment dispersed in a liquid medium. Pigment inks tend to have better ozone-fastness and light-fastness than dye-based inks. However, because the pigment is in the form of a particulate dispersion there is a tendency for pigment particles to agglomerate or flocculate whilst the ink is being stored and/or whilst the ink is being used (e.g. printed). Such agglomeration or flocculation before the ink has been printed onto a substrate is highly undesirable, particularly in ink jet printing inks where the printer nozzles are very small and are susceptible to blockage by any oversized particulate matter. Thus, in the ink jet field a great deal of effort has been spent attempting to increase the colloidal stability of pigment dispersions. It is particularly difficult to provide pigment inks having good colloidal stability when the liquid medium comprises large amounts of water-miscible organic solvents and relatively smaller amounts of water.

It is also desirable to provide pigment inks which offer high optical density (OD) especially when printed onto plain paper.

Pigment dispersions are often colloidally stabilised by means of a dispersant.

In our own studies on dispersant stabilised pigment inks we have found that it is particularly difficult to prepare inks which simultaneously exhibit good colloidal stability and high OD on plain paper. For example, we have found that dispersant stabilised pigment inks known in the art having a high colloidal stability provide a low OD when printed on to plain paper and vice versa.

Commercially, there still remains a need for pigment dispersions which can be used to prepare inks which solve, at least in part, one or more of the abovementioned problems.

According to a first aspect of the present invention there is provided a process for preparing an encapsulated pigment dispersion suitable for use in an ink jet printing ink comprising the following steps in the order I) followed by II):
  I) providing a dispersion comprising a pigment, a liquid medium and a dispersant comprising the repeat units from copolymerising the ethylenically unsaturated monomers in components a) to c):
    a) from 75 to 97 parts of one or more hydrophobic ethylenically unsaturated monomers comprising at least 50 parts benzyl (meth)acrylate;
    b) from 3 to 25 parts one or more hydrophilic ethylenically unsaturated monomers having one or more ionic group(s);
    c) from 0 to 2 parts of one or more hydrophilic ethylenically unsaturated monomers having a hydrophilic non-ionic group; and
    wherein the parts are by weight and the sum of the parts a) to c) add up to 100;
  II) cross-linking the dispersant in the presence of the pigment and the liquid medium.

DEFINITIONS

In this description the words "a" and "an" mean one or more unless indicated otherwise. Thus, for example, "a" pigment includes the possibility of there being more than one pigment, similarly "a" dispersant includes the possibility of there being more than one dispersant.
Step I)

In one embodiment the dispersion in step I) can be provided by a process comprising dispersing a pigment in a liquid medium in the presence of a dispersant having the abovementioned composition. Dispersion can be performed by any suitable method, including for example bead milling, bead shaking, ultrasonic treatment, homogenizing and/or microfluidizing. A preferred method for dispersing a pigment in liquid medium comprises bead milling. Typically, bead milling is performed using a composition comprising milling beads, a dispersant, a liquid medium and a relatively high proportion of pigment (often around 15-45% by weight relative to the weight of the liquid medium). After milling, the milling beads are removed, typically by filtration. The milled dispersion (mill-base) may be diluted with more of the liquid medium which optionally contains further dispersant, which may be the same as or different to the dispersant included in the aforementioned composition.

In another embodiment the dispersion in step I) may be obtained from a commercial source.
Pigment The pigment may comprise and preferably is an inorganic or organic pigment material or mixture thereof which is insoluble in the aqueous liquid medium.

Preferred organic pigments include, for example, any of the classes of pigments described in the Colour Index International, Third Edition, (1971) and subsequent revisions of, and supplements thereto, under the chapters headed "Pigments". Examples of organic pigments include those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Preferred organic pigments are phthalocyanines, especially copper phthalocyanine pigments, azo pigments, indanthrone, anthanthrone and quinacridone pigments.

Preferred inorganic pigments include carbon black, titanium dioxide, aluminium oxide, iron oxide and silicon dioxide.

In the case of carbon black pigments, these may be prepared in such a fashion that some Of the carbon black surface has oxidized groups (e.g. carboxylic acid and/or hydroxy groups). However, the amount of such groups is preferably not so high that the carbon black may be dispersed in water without the aid of a dispersant.

Preferably, the pigment is a cyan, magenta, yellow or black pigment.

The pigment may be a single chemical species or a mixture comprising two or more chemical species (e.g. a mixture comprising two or more different pigments). In other words, two or more different pigments may be used in the process of the present invention. Where two or more pigments are used these need not be of the same colour or shade.

Preferably, the pigment is not dispersible in an aqueous liquid medium without the aid of a dispersant, i.e. the presence of a dispersant is required to facilitate dispersion. Preferably, the pigment is not chemically surface treated, for example by having ionic groups covalently bonded to its surface (especially not —$CO_2H$ or —$SO_3H$).

Liquid Medium

Preferably, the liquid medium is aqueous i.e. it is or comprises water. The aqueous liquid medium may optionally contain one or more water-miscible organic solvents.

When the liquid medium comprises a mixture of water and one or more water-miscible organic solvents, the weight ratio of water to all of the water-miscible organic solvents present is preferably from 1:1 to 100:1, more preferably from 2:1 to 50:1 and especially from 3:1 to 20:1.

A preferred liquid medium comprises:
(a) from 50 to 100 parts, more preferably 75 to 100 parts water; and
(b) from 0 to 50 parts, more preferably 0 to 25 parts in total of one or more water-miscible organic solvents;
wherein the parts are by weight and the sum of the parts (a) and (b)=100.

In one embodiment the only liquid in the liquid medium is water.

The liquid medium may contain further components in addition to the water and water-miscible organic solvents, for example biocides, surfactants, further dispersant(s) and so on.

The water-miscible organic solvent can be used to increase the solubility of the dispersant in the aqueous liquid medium.

Preferably, the liquid medium has a viscosity of less than 100 mPa·s, more preferably less than 50 mPa·s, when measured at 25° C.

Dispersant

Preferred dispersants have graft, comb or star structures, more preferably a linear structure.

The dispersant is a copolymer. Preferred copolymers are block copolymers (e.g. its monomer units are distributed throughout the copolymer in blocks such as AAAA-BBBB), more preferably the copolymeric dispersant is a random copolymer (e.g. its monomer units are distributed randomly/statistically throughout the copolymer).

The dispersants used in the present invention may be prepared synthetically or they may be obtained from commercial sources.

Two or more dispersants as described above may be used. It is possible to utilise one or more dispersants of the kind described above and one or more further dispersant of a different kind. Preferably, all the dispersants present are as described herein.

Dispersants used in the process according to the first aspect of the present invention may be made by any suitable means. A preferred method is free radical polymerisation. Suitable free radical polymerisation methods include suspension, emulsion, dispersion and preferably solution polymerisation. Preferably, the dispersant is prepared by the solution polymerisation of ethylenically unsaturated monomers in components a), b) and c) in the presence of an aqueous or organic liquid carrier.

Component a) One or More Hydrophobic Ethylenically Unsaturated Monomers

The term hydrophobic means more hydrophobic than the hydrophilic monomers in components b) and c). Preferably, the hydrophobic monomers have no hydrophilic groups whether ionic or non-ionic. For example, they are preferably free of any acidic or polyethyleneoxy groups.

Preferably, the hydrophobic ethylenically unsaturated monomers have a calculated Log P value of at least 1, more preferably from 1 to 6, especially from 2 to 6.

A review by Mannhold, R. and Dross, K. (Quant. Struct-Act. Relat. 15, 403-409, 1996) describes 14 methods for calculating Log P values of compounds and especially drugs. From this review we prefer the "fragmental methods" and especially the fragmental method implemented by ACD labs software. The calculated Log P of a monomer may be calculated using commercially available computer software, for example using the Log P DB software version 7.04 or a later version of such software (which is available from Advanced Chemistry Development Inc (ACD labs)). Any ionic or ionisable groups are calculated in their neutral (unionised) form. A higher log P value corresponds to a more hydrophobic monomer. We have found the inclusion of such monomers aids in adsorbing the dispersant onto the pigment surface and in providing encapsulated pigment dispersions which when printed onto plain paper have good optical density.

Preferred hydrophobic ethylenically unsaturated monomers are styrenic monomers (e.g. styrene, alpha methyl styrene), aromatic (meth)acrylates (especially benzyl (meth)acrylate), $C_{1-30}$-hydrocarbyl (meth)acrylates, butadiene, (meth)acrylates containing poly($C_{3-4}$)alkylene oxide groups, (meth)acrylates containing alkylsiloxane or fluorinated alkyl groups and vinyl naphthalene.

Preferably, the dispersant comprises the repeat units from copolymerising from 75 to 97, more preferably from 77 to 97, especially from 80 to 93 and most especially from 82 to 91 parts by weight of component a).

We have found that dispersants comprising at least 50 parts of benzyl (meth)acrylate monomer repeat units provide encapsulated pigment dispersions with good stability and good OD when printed onto plain paper.

Component a) preferably comprises at least 60 parts, more preferably at least 70 and especially at least 80 parts by weight of benzyl (meth)acylate. The remainder required to obtain the overall preferred amounts of hydrophobic monomers may be provided by any one or more of the above hydrophobic monomers other than benzyl (meth)acrylate. These preferences provide final encapsulated pigment dispersions which offer even better optical density when printed onto plain paper.

Preferably, benzyl (meth)acrylate is benzyl methacrylate (rather than benzyl acrylate)

In a preferred embodiment component a) comprises only benzyl (meth)acrylate, more preferably only benzyl methacrylate.

Component b) One or More Hydrophilic Ethylenically Unsaturated Monomers Having One or More Ionic Groups In component b) each hydrophilic ethylenically unsaturated monomer present has one or more ionic groups.

Preferably, the monomers in component b) have a calculated Log P value of less than 1, more preferably from 0.99 to −2, especially from 0.99 to 0 and most especially from 0.99 to 0.5 when calculated in the un-neutralised (e.g. free acid) form.

Preferably, the ionic groups present in the monomers in component b) may be cationic or more preferably anionic.

Preferably, the monomers in component b) each have one or more anionic groups, more preferably each has one or more acidic anionic groups.

Preferred acidic anionic groups include sulphonic acid, phosphonic acid and especially carboxylic acid. Acidic sulfates, phosphates and polyphosphates may also be used as the acidic anionic groups.

Thus, preferably component b) is or comprises one or more monomers having one or more carboxylic acid groups.

Preferred hydrophilic ethylenically unsaturated monomers for component b) having one or more carboxylic acid groups include beta carboxylethyl acrylate, itaconic acid, maleic acid, fumaric acid, crotonic acid, more preferably acrylic acid and especially methacrylic acid. Preferably, these ethylenically unsaturated monomers when polymerised provide the only ionic groups in the dispersant.

In a preferred embodiment component b) is or comprises methacrylic acid.

Preferably, the dispersant comprises the repeat units from copolymerising from 3 to 25, more preferably from 3 to 23, especially from 7 to 20 and most especially from 9 to 18 parts by weight of component b). This is especially so when component b) comprises or more preferably is methacrylic acid.

Component c) No More Than 2 Parts of One or More Hydrophilic Ethylenically Unsaturated Monomers Having One or More Hydrophilic Non-Ionic Groups In component c) each hydrophilic ethylenically unsaturated monomer present has one or more hydrophilic non-ionic groups.

For the purposes of the present invention a monomer having both ionic and non-ionic hydrophilic groups is considered to belong to component c). Thus, all the ethylenically unsaturated monomers in component b) are free from hydrophilic non-ionic groups.

Preferably, the monomers in component c) have calculated Log P values of less than 1, more preferably from 0.99 to −2.

We have found that dispersants containing relatively small amounts of repeat units from hydrophilic ethylenically unsaturated monomers having one or more hydrophilic non-ionic groups tends to much reduce the ability of the final pigment inks to obtain high OD when printed onto plain paper. The presence of these repeat units in the dispersant also causes an increase in the critical coagulation concentration. In our studies we have found that by limiting the amount of these repeat units in the dispersant to no more than 2 parts by weight per 100 parts of all the monomer repeat units, high ODs on plain paper can be better obtained.

Preferably, component c) is less than 1 part, more preferably less than 0.5 parts, especially less than 0.1 parts and most especially 0 parts (i.e. absent). In this way the dispersant contains no repeat units from hydrophilic monomers having one or more hydrophilic non-ionic groups.

Examples of hydrophilic non-ionic groups include polyethyleneoxy, polyacrylamide, polyvinyl pyrrolidone, hydroxy functional celluloses and poly vinyl alcohol. The most common ethylenically unsaturated monomer having a hydrophilic non-ionic group is polyethyleneoxy (meth)acrylate.

In embodiments where repeat units from component c) are present in the dispersant (for example 2 parts by weight of component c) then in one embodiment the amount of component c) is deducted from the preferred amounts of component a). In this way the amounts of all the components a) to c) still adds to 100. Thus for examples where 2 parts by weight of component c) is present the preferred amounts of component a) expressed above would become from 73 to 95 (75-2 to 97-2), more preferably from 75 to 95 (77-2 to 97-2), especially from 78 to 91 (80-2 to 93-2) and most especially from 80 to 89 (82-2 to 91-2) parts by weight of component a). In an another embodiment it is possible to deduct the amount of component c) from the preferred amounts of component b) so that again the sum of the amounts of components a) to c) adds to 100 parts by weight.

Preferred Dispersants

In view of the foregoing a preferred dispersant comprises the repeat units from copolymerising the ethylenically unsaturated monomers a) to c):

(a) from 75 to 97 parts of one or more hydrophobic ethylenically unsaturated monomers comprising at least 50 parts of benzyl methacrylate;

(b) from 3 to 25 parts of methacrylic acid; and (c) no hydrophilic ethylenically unsaturated monomers having one or more hydrophilic non-ionic groups;

wherein the parts are by weight and the sum of the parts a) to c) add up to 100.

It is preferred that the only hydrophobic ethylenically unsaturated monomer in component a) is benzyl methacylate.

More preferably the dispersant comprises the repeat units from copolymerising the ethylenically unsaturated monomers a) to c):

(a) from 80 to 93 parts of one or more hydrophobic ethylenically unsaturated monomers comprising at least 50 parts benzyl methacrylate;

(b) from 7 to 20 parts of methacrylic acid;

(c) no hydrophilic ethylenically unsaturated monomers having a hydrophilic non-ionic group wherein the parts are by weight and the sum of the parts a) to c) add up to 100.

Ionic Group(s) in the Dispersant

Preferably, the dispersant has at least 0.35 mmoles, more preferably at least 0.9 mmoles, even more preferably at least 1.15 mmoles and especially at least 1.3 mmoles of ionic groups per g of dispersant.

Preferably, the dispersant has in order of increasing preference no more than 2.65 mmoles, 2.3 mmoles, 2.15 mmoles, 2.0 mmoles and 1.75 mmoles of ionic groups per g of dispersant.

Preferred dispersants have for example from 0.9 to 2.65 mmoles, especially from 1.0 to 2.3 mmoles and most preferably from 1.0 to 2.0 mmoles in total of ionic groups per gram of dispersant. We have found that such dispersants work particularly well in the present invention and can be used to provide pigment inks which offer particularly good optical density on plain paper and which have good colloidal stability.

The amount of ionic groups may be established by any suitable method a preferred method is a titrimetric method, for example acid/base titration.

Preferably, all the ionic groups present in the dispersant are anionic (especially acidic). It is especially preferred that all the ionic groups present in the dispersant are each independently selected from —$CO_2H$, —$SO_3H$ and —$PO_3H_2$ groups and salts thereof. Most preferably, all the ionic groups present in the dispersant are —$CO_2H$ groups or a salt thereof. We have found that when all the ionic groups are —$CO_2H$ groups or a salt thereof the dispersant can be used to prepare inks having particularly good optical density on plain paper. Thus, it is preferred that the above amounts of mmoles of ionic groups corresponds directly with the preferred amounts of mmoles of carboxylic acid groups in the dispersant.

Self Cross-Linkable Dispersants

The dispersant may optionally contain one or more groups which allow the dispersant to be self-cross-linked in step II).

In one embodiment the dispersant can be self-cross-linked by having unreacted ethylenically unsaturated groups (especially vinyl groups) which are subsequently cross-linked using an initiator (especially a free radical initiator).

In another embodiment the dispersant can be self cross-linked by having one or more ionic group(s) (as described in component b) and one or more groups which cross-link with the ionic group(s). For example, the dispersant may have a combination of carboxylic acid ionic groups and epoxy cross-linking groups.

The self cross-linking reaction is preferably performed by heating the dispersion.

Dispersant Adsorption

The dispersant is preferably adsorbed onto the pigment. Although, it is possible that the dispersant chemically bonds to pigment surface this is not preferred.

Preferably, the dispersant is not prepared by polymerising ethylenically unsaturated monomers in the presence of a pigment and a liquid medium.

Critical Coagulation Concentration

Preferably the dispersion in step I) has in order of increasing preference a sodium chloride critical coagulation concentration (CCC) of no more than 2.0M, no more than 1.8M, no more than 1.6M, no more than 1.4M, no more than 1.2M, no more than 1.0M and no more than 0.8M.

Preferably the dispersion in step I) has a CCC of at least 0.1M, more preferably at least 0.25M and especially at least 0.35M.

In preferred embodiments the CCC is from 0.1 to 2.0M, more preferably from 0.10 to 1.8M, even more preferably from 0.20 to 1.6M and especially from 0.30 to 0.8M.

The CCC is preferably measured by the following steps in the order i) to v):
  i) adjusting the concentration of pigment in the dispersion referred to in step I) to 10% by weight by adding or removing water;
  ii) preparing a test sample by mixing two drops of the adjusted dispersion prepared in step i) and 1.5 g of a solution of sodium chloride in water having a molarity of 0.5M;
  iii) storing the test sample prepared in step ii) for 24 hours at a temperature of 25° C.;
  iv) visually assessing the test sample to see if there is significant precipitation at the bottom of the sample;
  v) repeating steps i) to iv) using sodium chloride solutions of higher or lower molarity, until the lowest molarity of the sodium chloride solution is established at which the visual assessment referred to in step iv) reveals a significant precipitation at the bottom of the sample, this molarity being the CCC.

By significant precipitation we mean most or all of the pigment initially present in the test sample has precipitated, with mere traces of a precipitate being ignored. By using gravimetric or light transmittance methods it is possible to more accurately measure the degree of precipitation, however, for most purposes a visual assessment is sufficiently accurate and reliable.

In step v) we have found that using sodium chloride solutions of higher or lower molarity to the extent of, for example, 0.05M or 0.1M, will generally be suitable, depending on the accuracy required.

Experimentally, it is often expedient to simply prepare a large number of samples each having a different concentration of sodium chloride in order to quickly establish the CCC.

We have found that dispersions having the abovementioned CCC values tend to provide prints on plain paper of higher optical density.

Preferred Dispersion Characteristics

The pigment particles in the dispersion referred to in step I) preferably have an average particle size of no more than 1 micron, more preferably from 10 to 1000 nm, especially from 50 to 500 nm and most especially from 50 to 300 nm. The average particle size is preferably measured by a light scattering technique. Preferably the average particle size is a Z-average or volume average size.

Preferably the pH of the dispersion in step I) is from 5 to 12, more preferably from 7 to 11.

Step II) Cross-Linking the Dispersant

In step II) the dispersant may be self-cross-linked, cross-linked using a cross-linking agent or a combination of the two. In any case it is preferred that the cross-linking reaction links the dispersant molecules by covalent bonds.

The cross-linking reaction may utilise any of the pairs of groups described in PCT patent publication WO 2005/061087 at page 6, Table 1 wherein "reactive groups in the compound" in column 2 can be read as reactive groups in the cross-linking agent.

Preferred cross-linking agents include those having isocyanate, aziridine, n-methylol, carbodiimide, oxetane, oxazoline and especially epoxy groups. These reactive groups are particularly useful with dispersants wherein component b) comprises one or more hydrophilic ethylenically unsaturated monomers having one or more carboxylic acid groups. A preferred cross-linking agent has epoxy groups and no other cross-linking groups.

In a preferred embodiment the cross-linking in step II) is effected by an epoxy cross-linking agent and component b) is or comprises one or more hydrophilic ethylenically unsaturated monomers having one or more carboxylic acid groups.

Preferably, the cross-linking in step II) is performed by means of heating the dispersion, preferably to a temperature of from 40 to 100° C. To accelerate or promote the cross-linking reaction it is sometimes useful to add a catalyst.

The pH of the dispersion in step II) is preferably from 5 to 13, especially from 7 to 12.

When the cross-linking reaction involves epoxy groups it is preferred that the reaction is performed in the presence of a borate salt and/or boric acid.

Preferably, the cross-linking step is performed by a process comprising mixing a composition comprising the following components in the specified proportions:
  (a) 30 to 99.7 parts, preferably 50 to 97 parts, of the liquid medium;
  (b) 0.1 to 50 parts, preferably 1 to 30 parts, of the pigment;
  (c) 0.1 to 30 parts, preferably 1 to 30 parts, of the dispersant; and
  (d) 0.001 to 30 parts, preferably 0.01 to 10 parts, of a cross-linking agent;
wherein the parts are by weight.

Final Dispersion Properties

Preferably, the final encapsulated pigment dispersion resulting from the process of the present invention has a CCC of no more than 2.0M. The CCC of the resulting encapsulated pigment dispersion is preferably from 0.1 to 2.0M, more preferably from 0.10 to 1.8M, especially from 0.20 to 1.6M and most preferably from 0.30 to 1.0M.

Drying or Concentration

The process according to first aspect of the present invention may additionally comprise the step of removing some or all of the liquid medium from the product. The liquid medium may be removed by methods such as evaporation and filtration. In this way the pigment dispersion may be concentrated or converted into the form of a dry solid. When the liquid medium comprises a mixture of water and a water-miscible organic solvent it may be desirable to selectively remove the water-miscible organic solvent. This may be performed by for example distillation or by membrane treatment.

Purification of the Dispersion

Preferably, the process according to the first aspect of the present invention further comprises the step of purifying the encapsulated pigment dispersion. Preferably, the purification process is performed after step II). The purification can be by any suitable method including microfiltration, deionizer resins, centrifugation followed by decantation and washing. A preferred method is membrane filtration especially ultrafiltration. Preferred ultrafiltration membranes have a pore size of about 0.1 microns. Preferably, the dispersion after step II) is washed with from 5 to 50 volumes of purified water based on the volume of the dispersion. Preferably, the water used in the ultrafiltration process is deionized, distilled or has been purified by reverse osmosis. A preferred method of assessing when the dispersion has been sufficiently purified is to measure the conductivity of the permeate stream from the ultrafiltration stage and to continue adding further volumes of pure water until the permeate stream has a conductivity of less than 100 μS/cm, more preferably less than 50 μS/cm. The ultrafiltration is preferably performed on a dispersion which has from 10 to 15% by weight of pigment in the dispersion. We have found that purification can in some instances provide final dispersions and inks having further improved OD when printed onto plain paper.

Additives

It is preferred that the process of the present invention further comprises adding one or more additives selected from viscosity modifiers, pH buffers, metal chelating agents, surfactants, corrosion inhibitors, biocides, dyes, water miscible organic solvent(s) and/or kogation reducing additives. Preferably, these are added after step II).

Products of the Process

According to a second aspect of the present invention there is provided an encapsulated pigment dispersion obtained or obtainable by the process according to the first aspect of the present invention.

Inks and Ink Jet Printing Inks

The encapsulated pigment dispersion according to the second aspect of the present invention and the process according to the first aspect of the present invention may be used to prepare an ink, especially an ink jet printing ink.

Preferably, the ink has a viscosity of less than 50 mPa·s, more preferably less than 30 mPa·s and especially less than 15 mPa·s, when measured at a temperature of 25° C.

Preferably, the ink has a surface tension of 20 to 65 dynes/cm, more preferably 30 to 60 dynes/cm, when measured at a temperature of 25° C.

The pH of the ink is preferably from 4 to 11, more preferably from 7 to 10.

When the ink is to be used as ink jet printing ink, the ink preferably has a concentration of halide ions of less than 500 parts per million, more preferably less than 100 parts per million. It is especially preferred that the ink has less than 100, more preferably less than 50 parts per million of divalent and trivalent metals. Parts per million as used above refers to parts by weight relative to the total weight of the ink. These low concentrations of ions in the resultant ink can be achieved by the abovementioned purification step.

Preferably the process for making the ink includes a step for removing particles having a particle size of more than 1 micron in diameter, for example by filtration or centrifugation. Preferably the ink has less than 10%, more preferably less than 2% and especially less than 1% by weight of particles having a size of greater than 1 micron in diameter.

Preferably, the amount of pigment in the ink is from 0.1 to 15%, more preferably from 1 to 10% and especially from 3 to 10% by weight.

Organic Solvents in the Inks

Preferably the ink contains water and organic solvent in the weight ratio of 99:1 to 1:99, more preferably 99:1 to 50:50 and especially 95:5 to 70:30.

Preferred organic solvents are water-miscible organic solvents and mixtures of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably, the liquid medium comprises water and 2 or more, especially from 2 to 8, water-miscible organic solvents.

Especially preferred water-miscible organic solvents for the ink are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and di-$C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable ink media comprising a mixture of water and one or more organic solvents are described in U.S. Pat. No. 4,963,189, U.S. Pat. No. 4,703,113, U.S. Pat. No. 4,626,284 and EP 4,251,50A.

The ink jet printing ink can readily be added to the chamber of an ink jet printer cartridge.

Applications

The process of the present invention prepares encapsulated pigment dispersions especially suitable for use in an ink jet printing ink. In addition the encapsulated pigment dispersions may be used in inks, paints, tints, cosmetics, thermoplastics and thermosets.

According to a third aspect of the present invention there is provided the use of the process according to the first aspect of the present invention for preparing an ink jet printing ink. Preferably, this use is for the technical purpose of providing an ink jet printing ink which provides higher optical density when printed onto plain paper.

The ink jet printing inks containing encapsulated pigment dispersions prepared by the process of the present invention may in some embodiments be used with papers which comprise fixing agents to improve, for example, wet fastness, optical density or to reduce colour bleeding. In another embodiment ink jet printing inks containing encapsulated pigment dispersions prepared by the process of the present invention may be used alongside fixing agents. For example, an ink jet printer cartridge might comprise an ink as described above in one chamber and a liquid comprising a fixating agent in a further chamber. In this way the ink jet printer may apply the ink and the fixing agent to a substrate.

Fixing agents are well known in the art and include such things as metal salts, acids and cationic materials.

The invention is further illustrated by the following Examples in which all parts and percentages are by weight unless otherwise stated.

EXAMPLES

Such that the Experiments described below may be scaled as is required the amounts have been expressed in parts. The actual experiments were performed wherein all parts were grams.

1. Dispersant Preparation

1.1 Preparation of Dispersant (1)

A monomer feed composition was prepared by mixing benzyl methacrylate (871 parts), methacrylic acid (129 parts) and isopropanol (375 parts).

An initiator feed composition was prepared by mixing 2,2'-azobis(2-methylbutyronitrile) (22.05 parts) and isopropanol (187.5 parts).

Isopropanol (187.5 parts) was heated to 80° C. in a reactor vessel, continuously stirred and purged with a nitrogen gas atmosphere. The monomer feed and the initiator feed compositions were slowly fed into the reactor vessel whilst stirring the contents, maintaining the temperature at 80° C. and maintaining the nitrogen atmosphere. The monomer feed and the initiator feed were both fed into the reactor over 2 hours. The reactor vessel contents were maintained at 80° C. for a further 4 hours before cooling to 25° C. The resulting dispersant was then isolated from the reactor vessel contents by rotary evaporation under reduced pressure. This was designated as Dispersant (1). Dispersant (1), was an acrylic copolymer which had a number average molecular weight of 47,999, a weight average molecular weight of 89,332 and a polydispersity of 1.86 as measured by GPC. Dispersant (1) had an acid value corresponding to 1.5 mmoles of acid groups/g of dispersant. Dispersant (1) contained the repeat units from benzyl methacrylate and methacrylic acid in the proportions 87.1:12.9 by weight respectively.

1.2 Preparation of Dispersant (2)

Dispersant (2) was prepared in exactly the same way as Dispersant (1) except that the monomers used were benzyl methacrylate (827 parts) and methacrylic acid (173 parts). This was designated as Dispersant (2). Dispersant (2), was an acrylic copolymer which had a number average molecular weight of 50,823, a weight average molecular weight of 92,274 and a polydispersity of 1.82 as measured by GPC. Dispersant (2) had an acid value corresponding to 2.0 mmoles of acid groups/g of dispersant. Dispersant (2) contained the repeat units from Benzyl methacrylate and methacrylic acid in the proportions 82.7:17.3 by weight respectively. As is apparent from the higher proportion of methacrylic acid, Dispersant (2) is somewhat more hydrophilic than Dispersant (1).

1.3 Preparation of Dispersant (3)

Dispersant (3) was prepared in exactly the same way as Dispersant (1) except that the monomers used were benzyl methacrylate (785 parts) and methacrylic acid (215 parts). This was designated as Dispersant (3). Dispersant (3), was an acrylic copolymer which had a number average molecular weight of 47,535, a weight average molecular weight of 82,400 and a polydispersity of 1.73 as measured by GPC. Dispersant (3) had an acid value corresponding to 2.5 mmoles of acid groups/g of dispersant. Dispersant (3) contained the repeat units from Benzyl methacrylate and methacrylic acid in the proportions 78.5:21.5 by weight respectively. As is apparent from the higher proportion of methacrylic acid, Dispersant (3) is somewhat more hydrophilic than Dispersant (1) and Dispersant (2).

1.4 Preparation of Comparative Dispersant (1)

Comparative Dispersant (1) was prepared in exactly the same manner as Dispersant (1) except that the monomers used were 2-ethyl hexyl methacylate (350 parts), methyl methacrylate (413 parts) and methacrylic acid (237 parts). This was designated as Comparative Dispersant (1). Comparative Dispersant (1), was an acrylic copolymer which had a number average molecular weight of 11,865, a weight average molecular weight of 29,225 and a polydispersity of 2.5 as measured by GPC. Comparative Dispersant (1) had an acid value corresponding to 2.75 mmoles of acid groups/g of dispersant. Comparative Dispersant (1) contained the repeat units from 2-ethyl hexyl methacrylate, methyl methacrylate and methacrylic acid in the proportions 35:41.3:23.7 by weight respectively. As can be seen Comparative Dispersant (1) is free from benzyl (meth)acrylate repeat units.

1.5 Preparation of Comparative Dispersant (2)

Comparative Dispersant (2) was prepared in exactly the same manner as Dispersant (1) except that the monomers used were benzyl methacylate (350 parts), methyl methacrylate (413 parts) and methacrylic acid (237 parts). This was designated as Comparative Dispersant (2). Comparative Dispersant (2), was an acrylic copolymer which had a number average molecular weight of 52,105, a weight average molecular weight of 85,450 and a polydispersity of 1.64 as measured by GPC. Comparative Dispersant (2) had an acid value corresponding to 2.75 mmoles of acid groups/g of dispersant. Comparative Dispersant (2) contained the repeat units from benzyl methacrylate, methyl methacrylate and methacrylic acid in the proportions 35:41.3:23.7 by weight respectively. As can be seen Comparative Dispersant (2) comprises less than 50 parts benzyl (meth)acrylate repeat units per 100 parts polymer, thus it is outside the scope of the present invention.

2. Preparation of Dispersant Solutions

2.1 Dispersant Solution (1)

Dispersant (1) (200 parts) was dissolved in water to make up to (1000 parts) and neutralised with potassium hydroxide aqueous solution to give an aqueous solution having a pH of about 9. This resulted in Dispersant Solution (1) which contained approximately 20% by weight of Dispersant (1).

2.2 Dispersant Solution (2)

Dispersant solution (2) was prepared in exactly the same way as Dispersant Solution (1) except that Dispersant (2) was used in place of Dispersant (1). This resulted in Dispersant Solution (2) which contained approximately 20% by weight of Dispersant (2).

2.3 Dispersant Solution (3)

Dispersant solution (3) was prepared in exactly the same way as Dispersant Solution (1) except that Dispersant (3) was used in place of Dispersant (1). This resulted in Dispersant Solution (3) which contained approximately 20% by weight of Dispersant (3).

2.4 Comparative Dispersant Solution (1)

Comparative Dispersant solution (1) was made in exactly the same way as Dispersant solution (1) except that Comparative Dispersant (1) was used in place of Dispersant (1). This resulted in Comparative Dispersant Solution (1) which contained approximately 20% by weight of Comparative Dispersant (1).

2.5 Comparative Dispersant Solution (2)

Comparative Dispersant solution (2) was made in exactly the same way as Dispersant solution (1) except that Comparative Dispersant (2) was used in place of Dispersant (1). This resulted in Comparative Dispersant Solution (2) which contained approximately 20% by weight of Comparative Dispersant (2).

3. Preparation of Mill-Bases

3.1 Black Mill-Base (1)

Pigment powder (90 parts of NIPex™ 170IQ Carbon Black pigment, ex Degussa), Dispersant solution (1) (225 parts)

were mixed together to form a premixture. Water was in some cases added to the premixture as appropriate to provide a suitable viscosity for mixing and milling.

The premixture was thoroughly mixed together using a Silverson™ mixer for 30 minutes. After mixing the mixture was transferred to a vertical bead mill containing 1 mm beads. The mixture was then milled for 4 hours.

The milling beads were then filtered from the milled mixture. The milled mixture was adjusted to 10% by weight of pigment by the addition of pure water. This resulted in Black Mill-base (1). The pigment particles in the resulting mill-base had an My average particle size of 144 nm. The My average particle size was established for all dispersions using a Nanotrac 150 obtained from Honeywell-Microtrac.

3.2 Magenta Mill-Base (1)

Magenta Mill-base (1) was prepared in exactly the same way as Black Mill-base (1) except that Magenta Pigment (85 parts of TRM11, a C.I. Pigment 122 obtained from Dainichi Seika) and Dispersant solution (1) (215 parts) were used in place of the corresponding components described in Black Mill-base (1). In this case the milling was continued for a total of 8 hours. The pigment particles in the resulting mill-base had an My average particle size of 151 nm.

3.3 Yellow Mill-Base (1)

Yellow Mill-base (1) was prepared in exactly the same way as Black Mill-base (1) except that Yellow Pigment (100 parts of Irgalite™ Yellow GS an arylamide pigment obtained from Ciba) and Dispersant solution (1) (250 parts) were used in place of the corresponding components described in Mill-base (1). In this case the milling was continued for a total of 9 hours. The pigment particles in the resulting mill-base had an My average particle size of 131 nm.

3.4 Cyan Mill-Base (1)

Pigment powder (150 parts of TRB2 paste, a C.I. Pigment Blue 15:3 paste of 50% strength obtained from Dainichi Seika), Dispersant solution (1) (187.5 parts) were mixed together to form a premixture. Water was in some cases added to the premixture as appropriate to provide a suitable viscosity for mixing and milling.

The premixture was thoroughly mixed together using a Silverson™ mixer for 90 minutes. After mixing the mixture was transferred to a horizontal bead mill containing 0.5 mm beads. The mixture was then milled for 5 hours.

The milling beads were then filtered from the milled mixture. This resulted in Cyan Mill-base (1). The pigment particles in the resulting mill-base had an My average particle size of 171 nm.

3.5 Black Mill-Base (2)

Black-Mill-base (2) was prepared in exactly the same way as Black Mill-base (1) except that Dispersant solution (2) Was used in place of Dispersant Solution (1). In this case the milling was continued for a total of 3 hours. The pigment particles in the resulting mill-base had an My average particle size of 144 nm.

3.6 Magenta Mill-Base (2)

Magenta Mill-base (2) was prepared in exactly the same way as Magenta Mill-base (1) except that Dispersant solution (2) was used in place of Dispersant solution (1). In this case the milling was continued for a total of 7 hours. The pigment particles in the resulting mill-base had an My average particle size of 126 nm.

3.7 Yellow Mill-Base (2)

Yellow Mill-base (2) was prepared in exactly the same way as Yellow Mill-base (1) except that Dispersant solution (2) was used in place of Dispersant solution (1). The pigment particles in the resulting mill-base had an Mv average particle size of 136 nm.

3.8 Cyan Mill-Base (2)

Cyan Mill-base (2) was prepared in exactly the same way as Cyan Mill-base (1) except that Dispersant solution (2) was used in place of Dispersant solution (1). In this case the milling was continued for a total of 4 hours. The pigment particles in the resulting mill-base had an Mv average particle size of 158 nm.

3.9 Black Mill-Base (3)

Black Mill-base (3) was prepared in exactly the same way as Black Mill-base (1) except that Dispersant solution (3) was used in place of Dispersant Solution (1). In this case the milling was continued for a total of 8 hours. The pigment particles in the resulting mill-base had an My average particle size of 124 nm.

3.10 Comparative Black Mill-Base (1)

Comparative Black Mill-base (1) was prepared in exactly the same way as Black Mill-base (1) except that NIPex™ 170IQ, Carbon black pigment (225 parts) and Comparative Dispersant solution (1) (450 parts) were used in place of the corresponding components in Black Mill-base (1). In this case the milling was continued for a total of 6 hours. The pigment particles in the resulting mill-base had an Mv average particle size of 154 nm 3.11 Comparative Magenta Mill-Base (1)

Comparative Magenta Mill-base (1) was prepared in exactly the same way as Magenta Mill-base (1) except that TRM11 Magenta pigment (838 parts) and Comparative Dispersant solution (1) (1255 parts) were used in place of the corresponding components in Magenta Mill-base (1). In this case the milling was continued for a total of 12 hours. The pigment particles in the resulting mill-base had an Mv average particle size of 154 nm 3.12 Comparative Yellow Mill-Base (1)

Comparative Yellow Mill-base (1) was prepared in exactly the same way as Yellow Mill-base (1) except that Irgalite™ Yellow GS pigment (900 parts) and Comparative Dispersant solution (1) (1350 parts) were used in place of the corresponding components in Yellow Mill-base (1). In this case the milling was continued for a total of 23 hours. The pigment particles in the resulting mill-base had an Mv average particle size of 148 nm.

3.13 Comparative Cyan Mill-Base (1)

Comparative Cyan Mill-base (1) was prepared in exactly the same way as Cyan Mill-base (1) except that TRB2 paste (750 parts at 35% strength) and Comparative Dispersant solution (1) (451 parts after adjusting to 35% strength) were used in place of the corresponding components in Cyan Mill-base (1). In this case the milling was continued for a total of 3.5 hours.

3.14 Comparative Yellow Mill-Base (2)

Comparative Yellow Mill-base (2) was prepared in exactly the same way as Yellow Mill-base (1) except that TRY-13 yellow pigment (a C.I. Pigment Yellow 74 obtained from Dainichi Seika) (100 parts) and Comparative Dispersant solution (2), (250 parts) were used in place of the corresponding components in Yellow Mill-base (1). In this case the milling was continued for a total of 17 hours. The pigment particles in the resulting mill-base had an Mv average particle size of 145 nm.

4. Cross-Linking the Dispersant to Prepare the Encapsulated Pigment Dispersions 4.1 Cross-Linking of Mill-Bases All the mill-bases prepared above in points 3.1 to 3.14 were adjusted to a solids content of about 10% by weight by the addition of water.

The dispersants in each of the mill-bases were then cross-linked using a cross-linking agent, either polyethylene glycol diglycidyl ether (average molecular weight 526 obtained from Aldrich, hereafter abbreviated as PEGDGE) or trimethylolpropane polyglycidyl ether (Denacol EX-321 obtained from Nagase ChemteX, with weight per epoxy=140, hereafter abbreviated as EX-321). This cross-linked the carboxylic acid groups in the dispersant and thereby encapsulated the pigment. The cross-linking reaction was controlled by the presence of boric acid (obtained from Aldrich). In each case a mixture was prepared containing the amounts of the components as specified in Table 1. The cross-linking reaction was effected by heating the above described mixture to a temperature of about 65° C. for 5 hours. This prepared a range of different Encapsulated pigment dispersions with the references as indicated in column 1 of Table 1.

TABLE 1

| Encapsulated Pigment Dispersion reference | Mill-base used | Mill-base (parts) | Cross-linker (parts) | Boric acid (parts) | Final Mv (nm) |
|---|---|---|---|---|---|
| Encapsulated Black Dispersion (1) | Black Mill-base (1) | 450 | PEGDGE (1.777) | 0.417 | 143 |
| Encapsulated Magenta Dispersion (1) | Magenta Mill-base (1) | 150 | PEGDGE (0.592) | 0.139 | 165 |
| Encapsulated Yellow Dispersion (1) | Yellow Mill-base (1) | 120 | PEGDGE (0.474) | 0.111 | 145 |
| Encapsulated Cyan Dispersion (1) | Cyan Mill-base (1) | 500 | PEGDGE (1.97) | 0.464 | 180 |
| Encapsulated Black Dispersion (2) | Black Mill-base (2) | 450 | PEGDGE (1.777) | 0.417 | 135 |
| Encapsulated Magenta Dispersion (2) | Magenta Mill-base (2) | 150 | PEGDGE (0.592) | 0.139 | 115 |
| Encapsulated Yellow Dispersion (2) | Yellow Mill-base (2) | 120 | PEGDGE (0.474) | 0.111 | 142 |
| Encapsulated Cyan Dispersion (2) | Cyan Mill-base (2) | 432 | PEGDGE (1.71) | 0.400 | 156 |
| Encapsulated Black Dispersion (3) | Black Mill-base (3) | 100 | PEGDGE (0.92) | 0.216 | No data |
| Encapsulated Magenta Dispersion (3) | Magenta Mill-base (1) | 150 | EX-321 (0.315) | 0.139 | 160 |
| Comparative Encapsulated Black Dispersion (1) | Comparative Black Mill-base (1) | 500 | PEGDGE (3.686) | 0.865 | No data |
| Comparative Encapsulated Magenta Dispersion (1) | Comparative Magenta Mill-base (1) | 7025 | PEGDGE (38.8) | 9.1 | No data |
| Comparative Encapsulated Yellow Dispersion (1) | Comparative Yellow Mill-base (1) | 5646 | PEGDGE (13.4) | 3.1 | No data |
| Comparative Encapsulated Cyan Dispersion (1) | Comparative Cyan Mill-base (1) | 9614 | PEGDGE (45.6) | 10.7 | No data |
| Comparative Encapsulated Yellow Dispersion (2) | Comparative Yellow Mill-base (2) | 600 | PEGDGE (2.58) | 0.61 | No data |

In Table 1 the column titled "final Mv" tabulates the Mv average particle size of the encapsulated pigment prepared directly after the cross-linking step II).

5. Ultrafiltration

The Encapsulated pigment dispersions prepared above in 4.1 were each purified by means of ultrafiltration using membrane having a 0.1 micron pore size. The encapsulated pigment dispersions were diafiltered with approximately 10 to 40 wash volumes of pure deionized water per 1 volume of the Encapsulated pigment dispersion. The ultrafiltration membrane was then used to concentrate the encapsulated dispersion back to a solids content of around 10 to 13% by weight.

6. Critical Coagulation Concentration Measurements

The sodium chloride critical coagulation concentrations (CCC) for the Encapsulated pigment dispersions as purified after point 5 above were measured by the method previously described using 0.1M steps in the concentration of NaCl.

The results showed marked differences in the CCC values which we attribute largely to the differences in the dispersant composition.

TABLE 2

CCC values of Encapsulated pigment dispersions

| Encapsulated Pigment Dispersion | CCC (M NaCl) |
|---|---|
| Encapsulated Black Dispersion (1) | 0.2 |
| Encapsulated Magenta Dispersion (1) | 0.5 |
| Encapsulated Yellow Dispersion (1) | No data |
| Encapsulated Cyan Dispersion (1) | 0.4 |
| Encapsulated Black Dispersion (2) | 0.6 |
| Encapsulated Magenta Dispersion (2) | 0.8 |
| Encapsulated Yellow Dispersion (2) | No data |
| Encapsulated Cyan Dispersion (2) | 0.6 |
| Encapsulated Black Dispersion (3) | No data |
| Encapsulated Magenta Dispersion (3) | 0.5 |
| Comparative Encapsulated Black Dispersion (1) | 4 |
| Comparative Encapsulated Magenta Dispersion (1) | No data |
| Comparative Encapsulated Yellow Dispersion (1) | 4.5 |
| Comparative Encapsulated Cyan Dispersion (1) | 4.5 |
| Comparative Encapsulated Yellow Dispersion (2) | No data |

It can be readily seen that Encapsulated pigment dispersions containing Dispersants (1), (2) and (3) have considerably lower CCC values than those containing Comparative Dispersant (1).

7. Preparation of Inks and Comparative Inks

Each of the Encapsulated and Comparative Encapsulated pigment dispersions, after being purified in 5 above, were used to prepare an Ink or Comparative ink having one of the following compositions.

Ink Vehicle (1)

| Encapsulated pigment dispersion | X parts |
|---|---|
| 2-Pyrrolidone | 3.00 parts |
| Glycerol | 15.00 parts |
| 1,2 Hexane diol | 4.00 parts |
| Ethylene glycol | 5.00 parts |
| Surfynol ™ 465 | 0.50 parts |
| Pure water | sufficient to make 100 parts |

Surfynol™ 465 is a surfactant available from Airproducts.

Ink Vehicle (2)

| Encapsulated pigment dispersion | X parts |
|---|---|
| Triethyleneglycol monobutyl ether | 5.00 parts |
| Ethylene glycol | 15.00 parts |
| Surfynol ™ 465 | 0.70 parts |
| Pure water | sufficient to make 100 parts |

X Parts of Encapsulated Pigment Dispersion

For the black coloured inks 6 parts of black pigment on a pigment active (or pigment solids basis excluding the weight of any other solids components) were used (approximately 60 parts of Encapsulated pigment dispersion). For the Magenta coloured inks 5.5 parts of Magenta pigment were used on a pigment active basis. For the Yellow coloured inks 5 parts of Yellow pigment were used on a pigment active basis. For the Cyan coloured inks 4 parts of Cyan pigment were used on a pigment active basis.

Using the above ink compositions, for example, Encapsulated Black Dispersion (1) was used to prepare Black Ink (1) and Comparative Encapsulated Yellow Dispersion (2) prepared Comparative Yellow Ink (2). The exact correspondence of references is outlined fully in Table 3.

TABLE 3

| Ink | Encapsulated Pigment Dispersion) | Ink Vehicle |
|---|---|---|
| Black Ink (1) | Encapsulated Black Dispersion (1) | Ink Vehicle (1) |
| Magenta Ink (1) | Encapsulated Magenta Dispersion (1) | Ink Vehicle (1) |
| Yellow Ink (1) | Encapsulated Yellow Dispersion (1) | Ink Vehicle (1) |
| Cyan Ink (1) | Encapsulated Cyan Dispersion (1) | Ink Vehicle (1) |
| Black Ink (2) | Encapsulated Black Dispersion (2) | Ink Vehicle (1) |
| Magenta Ink (2) | Encapsulated Magenta Dispersion (2) | Ink Vehicle (1) |
| Yellow Ink (2) | Encapsulated Yellow Dispersion (2) | Ink Vehicle (1) |
| Cyan Ink (2) | Encapsulated Cyan Dispersion (2) | Ink Vehicle (2) |
| Black Ink (3) | Encapsulated Black Dispersion (3) | Ink Vehicle (1) |
| Magenta Ink (3) | Encapsulated Magenta Dispersion (3) | Ink Vehicle (1) |
| Comparative Black Ink (1) | Comparative Encapsulated Black Dispersion (1) | Ink Vehicle (1) |
| Comparative Magenta Ink (1) | Comparative Encapsulated Magenta Dispersion (1) | Ink Vehicle (1) |
| Comparative Yellow Ink (1) | Comparative Encapsulated Yellow Dispersion (1) | Ink Vehicle (1) |
| Comparative Cyan Ink (1) | Comparative Encapsulated Cyan Dispersion (1) | Ink Vehicle (1) |
| Comparative Yellow Ink (2) | Comparative Encapsulated Yellow Dispersion (2) | Ink Vehicle (1) |

8. Preparation of Prints

Each of the Inks and Comparative Inks described above in point 7 were printed onto plain (untreated) paper, namely Xerox 4200 paper. Printing was performed by means of an SEC D88 ink jet printer printing 100% blocks of colour.

9. Measurement of Optical Density

For each print the reflectance optical density (ROD) was measured using a Gretag Macbeth key wizard V2.5 Spectrolino photodensitometer instrument, illuminated using a D65 light source at an observer angle of 2° and with no filter fitted. Measurements were taken at least two points along the print and were then averaged.

10. Results of Optical Density Measurements

The results of the ROD measurements are summarised below in Table 4.

TABLE 4

Prints obtained from Inks and Comparative Inks

| Ink | Dispersant | ROD |
|---|---|---|
| Black Ink (1) | Dispersant (1) | 1.20 |
| Black Ink (2) | Dispersant (2) | 1.17 |
| Black Ink (3) | Dispersant (3) | 1.07 |

TABLE 4-continued

Prints obtained from Inks and Comparative Inks

| Ink | Dispersant | ROD |
|---|---|---|
| Comparative Black Ink (1) | Comparative Dispersant (1) | 0.97 |
| Magenta Ink (1) | Dispersant (1) | 1.18 |
| Magenta Ink (2) | Dispersant (2) | 1.08 |
| Magenta Ink (3) | Dispersant (1) | 1.20 |
| Comparative Magenta Ink (1) | Comparative Dispersant (1) | 0.99 |
| Yellow Ink (1) | Dispersant (1) | 1.18 |
| Yellow Ink (2) | Dispersant (2) | 1.10 |
| Comparative Yellow Ink (1) | Comparative Dispersant (1) | 1.00 |
| Comparative Yellow Ink (2) | Comparative Dispersant (2) | 1.01 |
| Cyan Ink (1) | Dispersant (1) | 1.18 |
| Cyan Ink (2) | Dispersant (2) | 1.12 |
| Comparative Cyan Ink (1) | Comparative Dispersant (1) | 1.01 |

From Table 4, it can readily be seen that the Encapsulated pigment dispersions prepared by the process according to the first aspect of the present invention can be used to prepared ink jet printing inks which provide especially good ROD when printed onto plain paper.

11. Further Inks

The further inks described in Tables I and II may be prepared wherein the ultrafiltered Encapsulated pigment dispersions (EPDs), as tabulated in the $1^{st}$ Column, may be used in the amounts tabulated in the second column.

Numbers quoted in the third column onwards refer to the number of parts of the relevant ink components. All parts are by weight. The inks may be applied to paper by thermal, piezo or Memjet ink jet printing.

The following abbreviations are used in Table I and II:

PG=propylene glycol

DEG=diethylene glycol

NMP=N-methylpyrrolidone

DMK=dimethylketone

IPA=isopropanol

MeOH=methanol

2P=2-pyrrolidone

MIBK=methylisobutyl ketone

P12=propane-1,2-diol

BDL=butane-2,3-diol

Surf=Surfynol™ 465 from Airproducts

PHO=$Na_2HPO_4$ and

TBT=tertiary butanol

TDG=thiodiglycol

GLY=Glycerol nBDPG=mono-n-butyl ether of dipropylene glycol nBDEG=mono-n-butyl ether of diethylene glycol nBTEG=mono-n-butyl ether of triethylene glycol EPD—Encapsulated pigment dispersion EBD1—Encapsulated Black Dispersion (1)

EBD2—Encapsulated Black Dispersion (2)

EMD1—Encapsulated Magenta Dispersion (1)

EMD2—Encapsulated Magenta Dispersion (2)

EYD1—Encapsulated Yellow Dispersion (1)

EYD2—Encapsulated Yellow Dispersion (2)

TABLE I

| EPD | EPD Content | Water | PG | DEG | NMP | DMK | NaOH | Na Stearate | IPA | MEOH | 2P | MIBK | GLY | nBDPG |
|---|---|---|---|---|---|---|---|---|---|---|---|---|---|---|
| EBD1 | 30 | 50 | 5 | | 6 | 3 | | | | | 5 | | 1 | |
| EBD1 | 30 | 59.8 | | 5 | 5 | | 0.2 | | | | | | | |
| EBD1 | 40 | 45 | 3 | | 3 | 3 | | | | | 5 | 1 | | |
| EBD1 | 40 | 51 | | 8 | | | | | | | | 1 | | |
| EMD1 | 40 | 45.8 | 5 | | | | | 0.2 | 4 | | | 5 | | |
| EMD1 | 40 | 41 | | | 9 | | 0.5 | 0.5 | | | 9 | | | |
| EMD1 | 40 | 10 | 4 | 15 | 3 | 3 | | | 6 | 10 | 5 | 4 | | |
| EMD1 | 40 | 30 | | 20 | | | | | 9 | | | | | 1 |
| EYD1 | 50 | 25 | 5 | 4 | | 5 | | | | 6 | | 5 | | |
| EYD1 | 50 | 29.7 | 3 | 5 | 2 | 10 | | 0.3 | | | | | | |
| EYD1 | 50 | 15 | | 5 | 4 | 6 | | | 5 | 4 | 6 | 5 | | |
| EYD1 | 50 | 46 | | | | | | | | 4 | | | | |
| EBD2 | 40 | 50 | 5 | | | | | | 5 | | | | | |
| EBD2 | 40 | 40 | 2 | 6 | 2 | 5 | | | 1 | | 4 | | | |
| EMD2 | 40 | 40 | | 5 | | | | | | | 15 | | | |
| EMD2 | 40 | 44 | | | 1 | | | | | | 5 | | | |
| EYD2 | 50 | 30 | 2 | | 1 | 10 | | | | | 2 | | 6 | |
| EYD2 | 50 | 39.7 | | | | 7 | 0.3 | | 3 | | | | | |
| EBD1 | 40 | 29 | 2 | 20 | | 1 | | | | | 3 | 3 | | |
| EBD1 | 40 | 51 | | | 2 | | | | | | 5 | | | |
| EBD1 | 40 | 40 | | | 4 | | | | | | | | 20 | |
| EBD1 | 40 | 40 | | | | | | | | | | | | 20 |

TABLE II

| EPD | EPD content | Water | PG | DEG | NMP | Surf | TBT | TDG | BDL | PHO | 2P | PI2 | nBDEG | nBTEG |
|---|---|---|---|---|---|---|---|---|---|---|---|---|---|---|
| EBD1 | 30 | 49.8 | 15 | | | 0.2 | | | | | 5 | | | |
| EBD1 | 30 | 58.8 | | 5 | | 0.2 | | | | 1.2 | | 5 | | |
| EMD1 | 40 | 44.65 | 5 | 5 | | 0.15 | 4 | 0.2 | | | | | | 1 |
| EMD1 | 40 | 49.88 | | 6 | 4 | | | | | 0.12 | | | | |
| EYD1 | 40 | 41.7 | 4 | 8 | | 0.3 | | | | | 6 | | | |
| EYD1 | 40 | 44.8 | | 10 | | | | | 5 | 0.2 | | | | |
| EBD1 | 50 | 39.7 | | 5 | 5 | | | 0.3 | | | | | | |
| EBD1 | 50 | 20 | | 10 | 4 | | | | 1 | | 4 | 11 | | |
| EMD1 | 40 | 35 | 4 | 10 | 3 | | | 2 | | | 6 | | | |
| EMD1 | 40 | 51 | | | 6 | | | | | | 3 | | | |
| EYD1 | 40 | 35.05 | | 9 | 7 | | 2 | | | 0.95 | 5 | | 1 | |
| EYD1 | 40 | 38 | 5 | 11 | | | | | | | 6 | | | |
| EBD2 | 50 | 36 | | | 7 | | | | | | 7 | | | |
| EBD2 | 50 | 24.5 | 5 | 5 | 4.1 | 1 | 0.2 | 0.1 | 5 | 0.1 | 5 | | | |
| EMD2 | 40 | 50 | | 10 | | | | | | | | | | |
| EMD2 | 40 | 50 | | | | | | 10 | | | | | | |
| EYD2 | 30 | 48 | | | 5 | | 12 | | | | 5 | | | |
| EYD2 | 30 | 40 | 2 | | 8 | | 15 | | | | 5 | | | |
| EBD1 | 40 | 40 | | | | | | 8 | | 12 | | | | |
| EBD1 | 40 | 40 | | 10 | | | | | | | | | 10 | |
| EBD1 | 40 | 40 | | | | | | | | 10 | | | | 10 |

The invention claimed is:

1. A process for preparing an encapsulated pigment dispersion suitable for use in an ink jet printing ink comprising the following steps in the order I) followed by II):

I) providing a dispersion comprising a pigment, a liquid medium and a dispersant comprising the repeat units from copolymerising the ethylenically unsaturated monomers in components a) to c):

a) from 75 to 97 parts of one or more hydrophobic ethylenically unsaturated monomers having a calculated log P of at least 1 and comprising at least 50 parts benzyl (meth)acrylate;

b) from 3 to 25 parts one or more hydrophilic ethylenically unsaturated monomers having a calculated log P of less than 1 and having one or more ionic group(s);

c) from 0 to 2 parts of one or more hydrophilic ethylenically unsaturated monomers having a hydrophilic non-ionic group selected from the group consisting of polyethyleneoxy, polyacrylamide, polyvinyl pyrrolidone, hydroxy functional celluloses and poly vinyl alcohol; and wherein the parts are by weight and the sum of the parts a) to c) add up to 100;

II) cross-linking the dispersant in the presence of the pigment and the liquid medium with trimethylolpropane polyglycidyl ether such that the cross-linking reaction links the dispersant molecules by covalent bonds, wherein the dispersant has 0.9 to 2.65 mmoles of ionic groups per g of dispersant.

2. A process according to claim 1 wherein component a) comprises at least 60 parts of benzyl (meth)acrylate.

3. A process according to claim 1 wherein component a) comprises at least 70 parts of benzyl (meth)acrylate.

4. A process according to claim 1 wherein component a) consists of benzyl (meth)acrylate.

5. A process according to claim 1 wherein component b) comprises methacrylic acid.

6. A process according to claim 1 wherein component b) is methacrylic acid.

7. A process according to claim 1 wherein component c) is not present.

8. A process according to claim 1 wherein the dispersant comprises the repeat units from copolymerising the ethylenically unsaturated monomers in components a) to c):
  (a) from 80 to 93 parts of one or more hydrophobic monomers having a calculated log P of at least 1 and comprising at least 50 parts benzyl (meth)acrylate;
  (b) from 7 to 20 parts of methacrylic acid;
  (c) 0 parts of hydrophilic ethylenically unsaturated monomers having a hydrophilic non-ionic group selected from the group consisting of polyethyleneoxy, polyacrylamide, polyvinyl pyrrolidone, hydroxy functional celluloses and poly vinyl alcohol, wherein the parts are by weight and the sum of the parts a) to c) add up to 100.

9. A process according to claim 1 wherein component b) comprises one or more monomers having one or more carboxylic acid groups.

10. A process according to claim 1 wherein the liquid medium comprises water.

11. A process according to claim 1 wherein the dispersion provided in step I) has a sodium chloride critical coagulation concentration of no more than 2.0M.

12. A process according to claim 1 wherein the resulting encapsulated pigment dispersion has a sodium chloride critical coagulation concentration of no more than 2.0M.

13. A process according to claim 12 wherein the resulting encapsulated pigment dispersion has a sodium chloride critical coagulation concentration of from 0.2M to 1.6M.

14. A process according to claim 1 further comprising the step of purifying the encapsulated pigment dispersion.

15. A process according to claim 1 further comprising adding one or more additives selected from the group consisting of viscosity modifiers, pH buffers, metal chelating agents, surfactants, corrosion inhibitors, biocides, dyes, water-miscible organic solvent(s) and kogation reducing additives.

16. An encapsulated pigment dispersion obtained by a process according to claim 1 or claim 8.

17. An ink jet printing ink comprising an encapsulated pigment dispersion according to claim 16.

18. An ink jet printer cartridge comprising a chamber and an ink jet printing ink according to claim 17, wherein the ink jet printing ink is present in the chamber.

19. A process according to claim 1 wherein the trimethylolpropane polyglycidyl ether has a weight per epoxy group of 140.

20. A process according to claim 1 wherein the cross-linking is performed in the presence of a borate salt and/or boric acid.

21. A process according to claim 1 wherein the dispersant is free from hydrophilic ethylenically unsaturated monomers having one or more hydrophilic non-ionic groups.

22. A process according to claim 1 wherein the hydrophobic ethylenically unsaturated monomers having a calculated log P of at least 1 consist of benzyl (meth)acrylate and the dispersant is free from hydrophilic ethylenically unsaturated monomers having one or more hydrophilic non-ionic groups.

23. A process according to claim 1 wherein component b) consists of one or more monomers having one or more carboxylic acid groups.

24. A process according to claim 1 wherein the liquid medium consists of water.

\* \* \* \* \*